(12) United States Patent
Kowada et al.

(10) Patent No.: US 8,353,152 B2
(45) Date of Patent: Jan. 15, 2013

(54) EXHAUST EMISSION CONTROL DEVICE

(75) Inventors: Minoru Kowada, Hino (JP); Tsutomu Shimizu, Hiratsuka (JP)

(73) Assignees: Hino Motors, Ltd., Hino-shi (JP); Tokyo Roki Co., Ltd., Yokohama-shi (JP)

( * ) Notice: Subject to any disclaimer, the term of this patent is extended or adjusted under 35 U.S.C. 154(b) by 190 days.

(21) Appl. No.: 12/742,321

(22) PCT Filed: Nov. 20, 2008

(86) PCT No.: PCT/JP2008/003410
§ 371 (c)(1),
(2), (4) Date: May 11, 2010

(87) PCT Pub. No.: WO2009/066458
PCT Pub. Date: May 28, 2009

(65) Prior Publication Data
US 2010/0257850 A1    Oct. 14, 2010

(30) Foreign Application Priority Data

Nov. 21, 2007  (JP) ................................ 2007-301291

(51) Int. Cl.
*F01N 3/00* (2006.01)
(52) U.S. Cl. .......................................... 60/295; 60/297
(58) Field of Classification Search ................. 60/286, 60/295, 297
See application file for complete search history.

(56) References Cited

U.S. PATENT DOCUMENTS

2004/0261404 A1* 12/2004 Vignassa et al. ............... 60/324
2009/0313979 A1   12/2009 Kowada
2010/0000203 A1    1/2010 Kowada
2010/0132333 A1    6/2010 Endo et al.
2010/0132348 A1    6/2010 Kowada

FOREIGN PATENT DOCUMENTS

| JP | 6 63818 | 9/1994 |
| JP | 8 75065 | 3/1996 |
| JP | 2004 108221 | 4/2004 |
| JP | 2005 155404 | 6/2005 |
| JP | 2005 171917 | 6/2005 |
| JP | 2007 40149 | 2/2007 |
| JP | 2007 40224 | 2/2007 |

OTHER PUBLICATIONS

U.S. Appl. No. 12/677,957, filed Mar. 12, 2010, Kowada et al.

(Continued)

*Primary Examiner* — Kenneth Bomberg
*Assistant Examiner* — Dapinder Singh
(74) *Attorney, Agent, or Firm* — Oblon, Spivak, McClelland, Maier & Neustadt, L.L.P.

(57) ABSTRACT

An exhaust emission control device, which can absorb thermal expansion difference between a particulate filter and a selective reduction catalyst without causing urea deposition, has the filter and the catalyst arranged in parallel with each other with their entry ends facing the same direction. An S-shaped communication passage is provided to introduce the exhaust gas from a discharge end of the filter into an entry end of the catalyst through turndown, urea water being added upstream of the communication passage. A mixing pipe providing a straight section of the communication passage at an intermediate portion thereof, with a double-pipe portion constituted by overlapped stretchable/retractable inner and outer pipes, the outer pipe having a terminal end secured to an outer periphery of the inner pipe and being provided with an axially expansible and contractible bellows, a sealing ring fitted over an outer periphery of a terminal end of the inner pipe.

2 Claims, 3 Drawing Sheets

OTHER PUBLICATIONS

U.S. Appl. No. 12/679,677, filed Mar. 24, 2010, Kowada.
U.S. Appl. No. 12/994,381, filed Nov. 23, 2010, Kowada.
U.S. Appl. No. 12/738,994, filed Apr. 21, 2010, Kowada.
U.S. Appl. No. 12/676,056, filed Mar. 2, 2010, Kowada.
U.S. Appl. No. 12/678,941, filed Mar. 18, 2010, Endo, et al.
U.S. Appl. No. 12/674,106, filed Feb. 18, 2010, Kimura.

* cited by examiner

EXHAUST EMISSION CONTROL DEVICE

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the selective reduction catalyst and the particulate filter, thereby attaining lessening of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a location where the urea water is added and the selective reduction catalyst. However, such arrangement of the particulate filter and the selective reduction catalyst substantially spaced apart from each other will extremely impair the mountability on a vehicle.

In order to overcome this, a compact exhaust emission control device as shown in FIG. 1 has been proposed. In the exhaust emission control device shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8, is a selective reduction catalyst 6 having a property capable of selectively reacting $NO_x$ with ammonia even in the presence of oxygen. A discharge end of the particulate filter 5 is connected to an entry end of the selective reduction catalyst 6 through an S-shaped communication passage 9 with an injector 11 at its upstream side such that the exhaust gas 3 discharged through the discharge end of the particulate filter 5 is turned down into the entry end of the adjacent selective reduction catalyst 6.

The mixing pipe 10, which provides a straight portion of the communication passage 9, has the entry end coaxially provided with the injector 11 so as to add the urea water centrally of the mixing pipe 10. For example, as shown in FIG. 2, a side surface of the entry end in the mixing pipe 10 adjacent to the discharge side of the particulate filter 5 is formed with an opening 12 into which the exhaust gas 3 is tangentially introduced by, for example, guide fins 13 so that a resultant swirling flow formed in the mixing pipe 10 can facilitate dispersion of the urea water added by the injector 11.

In FIG. 1, an oxidation catalyst 14 for oxidization treatment of unburned fuel in the exhaust gas 3 is arranged in the casing 7 and in front of the particulate filter 5. With an accumulated amount of the particulates being increasing, fuel is added to the exhaust gas 3 upstream of the oxidation catalyst 14 so that the added fuel undergoes oxidation reaction during its passage through the catalyst 14, the exhaust gas 3 being heated by a resultant reaction heat to increase a catalyst floor temperature of the particulate filter 5 just behind, whereby the captured particulates may be actively burned out to attain forced regeneration of the particulate filter 5.

Arranged in the casing 8 and behind the selective reduction catalyst 6 is an ammonia lessening catalyst 15 for oxidization treatment of surplus ammonia having passed through the reduction catalyst 6 without reaction. Thus, ammonia is prevented from being discharged to outside of the vehicle while entrained in the exhaust gas 3.

With such construction being employed, particulates in the exhaust gas 3 are captured by the particulate filter 5 and the urea water is added by the injector 11 into the exhaust gas 3 at the entry end of the mixing pipe 10 and decomposed into ammonia and carbon dioxide gas, so that $NO_x$ in the exhaust gas 3 is favorably reduced and depurated on the selective reduction catalyst 6 by the ammonia to thereby attain lessening of both the particulates and $NO_x$ in the exhaust gas 3.

In this case, the exhaust gas 3 discharged through the discharge end of the particulate filter 5 is turned down by the communication passage 9 into the entry end of the adjacent selective reduction catalyst 6. As a result, enough reaction time is ensured for production of ammonia from the urea water since a long distance is ensured between the location where the urea water is added by the injector 11, and the selective reduction catalyst 6.

Moreover, the particulate filter 5 and the selective reduction catalyst 6 are arranged in parallel with each other and the communication passage 9 is arranged between and along the filter 5 and the catalyst 6, so that the whole structure becomes compact in size to substantially enhance its mountability on a vehicle.

As to a prior art literature pertinent to the invention, there already exists, for example, the following Patent Literature 1.

[Patent Literature 1] JP 2005-155404A

SUMMARY OF INVENTION

Technical Problems

However, with such structure having the particulate filter 5 and the selective reduction catalyst 6 arranged in parallel with each other and interconnected through the S-shaped communication passage 9, thermal expansion difference between the particulate filter 5 and the selective reduction catalyst 6 becomes greater upon, for example, forced regeneration of the particulate filter 5, so that relative thermal strain tends to occur between the particulate filter 5 and the selective reduction catalyst 6. Thus, stress may be concentrated at and cause the breakage of, for example, connections and flections of the S-shaped communication passage 9 interconnecting other parts.

Then, the inventors devised a mixing pipe 10 providing a straight portion that extends axially of the particulate filter 5 and the selective reduction catalyst 6 in the communication passage 9. The mixing pipe 10 is formed at an intermediate portion of the S-shaped communication passage with an axially expansible and contractible bellows. Such bellows is formed with a number of continuous annular grooves on an inner periphery of the straight portion of the S-shaped communication passage 9. Thus, mist of the urea water added upstream of the bellows at the entry end of the mixing pipe 10 by the injector 11 tends to collide against the annular grooves, so that it is feared that the urea water colliding against the grooves may be deposited as solid urea without decomposition into ammonia.

The invention was made in view of the above and has as its object to provide an exhaust emission control device which can reliably absorb thermal expansion difference between a particulate filter and a selective reduction catalyst without causing deposition of urea.

Solution to Problems

The invention is directed to an exhaust emission control device comprising a particulate filter, a selective reduction catalyst capable of selectively reacting $NO_x$ with ammonia even in the presence of oxygen, said selective reduction catalyst being arranged downstream of and in parallel with said particulate filter such that entry ends thereof are directed to the same direction, and an S-shaped communication passage for introduction of exhaust gas from a discharge end of the particulate filter to the entry end of the selective reduction catalyst through turndown, urea water being addible upstream of said communication passage, characterized in that a straight portion extending axially of the particulate filter and of the selective reduction catalyst in the communication passage is constituted at an intermediate portion thereof by a double-pipe portion comprising overlapped inner and outer pipes which are relatively stretchable and retractable and one and the other of which provide upstream and downstream ducts of said straight portion, respectively, said outer pipe in said double-pipe portion having a terminal end secured to an outer periphery of the inner pipe and being formed at an appropriate position with an axially expansible and contractible bellows, a sealing ring being fitted over the outer periphery at a terminal end of the inner pipe to slidably abut against an inner periphery of the outer pipe so as to prevent intrusion of the exhaust gas.

Thus, in this manner, even if thermal expansion difference between the particulate filter and the selective reduction catalyst becomes greater upon, for example, forced regeneration of the particulate filter, such thermal expansion difference is absorbed by expansion or contraction of the bellows of the double-pipe portion to prevent relative thermal strain from occurring between the particulate filter and the selective reduction catalyst. As a result, the stress is prevented from being concentrated to at, for example, connections and flections of the communication passage for connection of the particulate filter with the selective reduction catalyst.

The bellows on the outer pipe provides, on an inner periphery of the pipe, a number of continuous annular grooves inverse in shape to the bellows; these annular grooves are covered by the inner pipe so as not to be exposed to the flow of the exhaust gas. As a result, mist of the urea water is prevented from colliding against the annular grooves, so that the urea water is prevented from being deposited as solid urea without decomposition into ammonia through collision against the annular grooves.

Moreover, the sealing ring is fitted over the outer periphery at the terminal end of the inner pipe to slidably abut on the inner periphery of the outer pipe so as to prevent intrusion of the exhaust gas, so that there is no fear that the exhaust gas is intruded into the gap between the inner and outer pipes while having the mist of the urea water entrained thereon. Moreover, even if the bellows is expanded or contracted, the terminal end of the inner pipe is kept coaxial with the inner periphery of the outer pipe by the sealing ring, so that relative displacement of the inner and outer pipes is axially guided to prevent curved displacement at the bellows.

Advantageous Effects of Invention

According to the exhaust emission control device of the invention as mentioned above, the following features and advantages can be obtained.

(I) Thermal expansion difference between the particulate filter and the selective reduction catalyst can be reliably absorbed without causing deposition of urea; thus, relative thermal strain between the particulate filter and the selective reduction catalyst owing to such thermal expansion difference can be prevented to prevent stress concentration at, for example, connections and flections of the communication passage.

(II) Intrusion of the exhaust gas into the gap between the inner and outer pipes can be prevented by the sealing ring, so that the mist of the urea water is prevented from entering between the inner and outer pipes and depositing urea. Moreover, the terminal end of the inner pipe can be kept coaxial with the inner periphery of the outer pipe by the sealing ring. Thus, even if the bellows is expanded or contracted, relative displacement of the inner and outer pipes can be axially guided to prevent the curved displacement at the bellows, thereby preventing a decrease in the strength of the straight portion in the communication passage.

Figure 1:
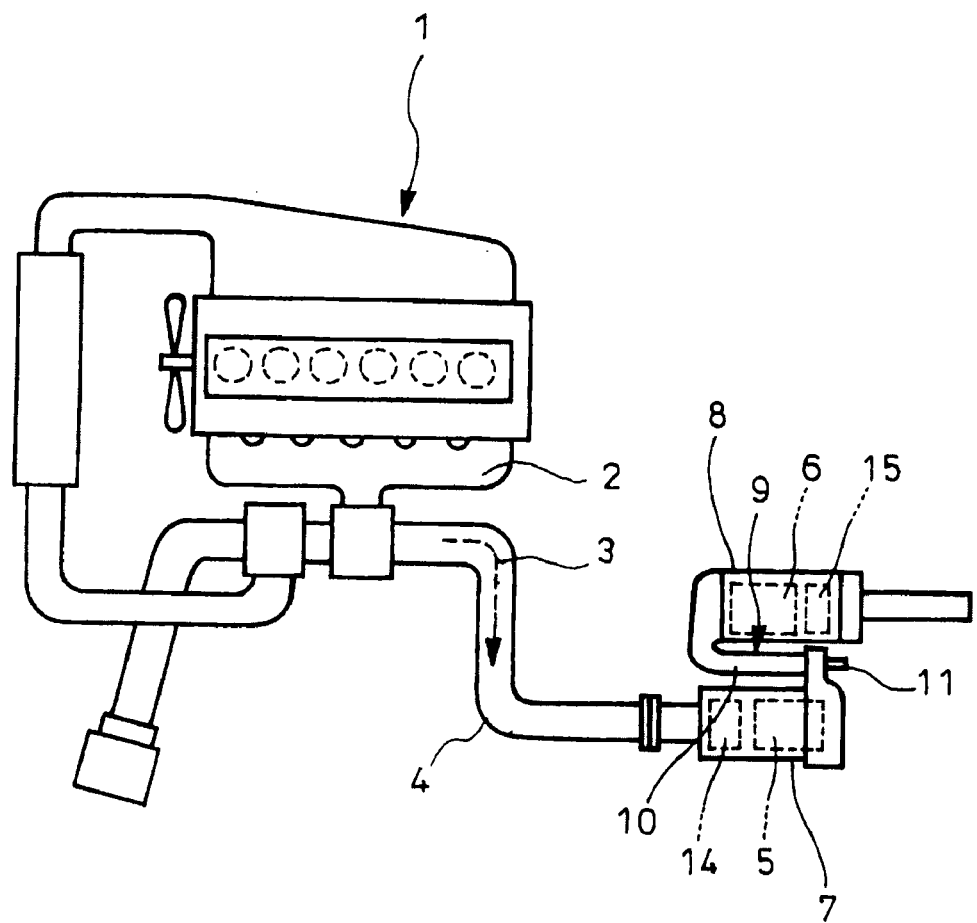
FIG. 1 is a schematic view showing a conventional device.

REFERENCE SIGNS LIST 3 exhaust gas
5 particulate filter
6 selective reduction catalyst
9 communication passage
10 mixing pipe (straight portion)
16 inner pipe
16a inner pipe terminal end
17 outer pipe
17a outer pipe terminal end
18 double-pipe portion
19 bellows
20 sealing ring
21 upstream duct
22 downstream duct

DESCRIPTION OF EMBODIMENT

An embodiment of the invention will be described in conjunction with the drawings.

Figure 2:
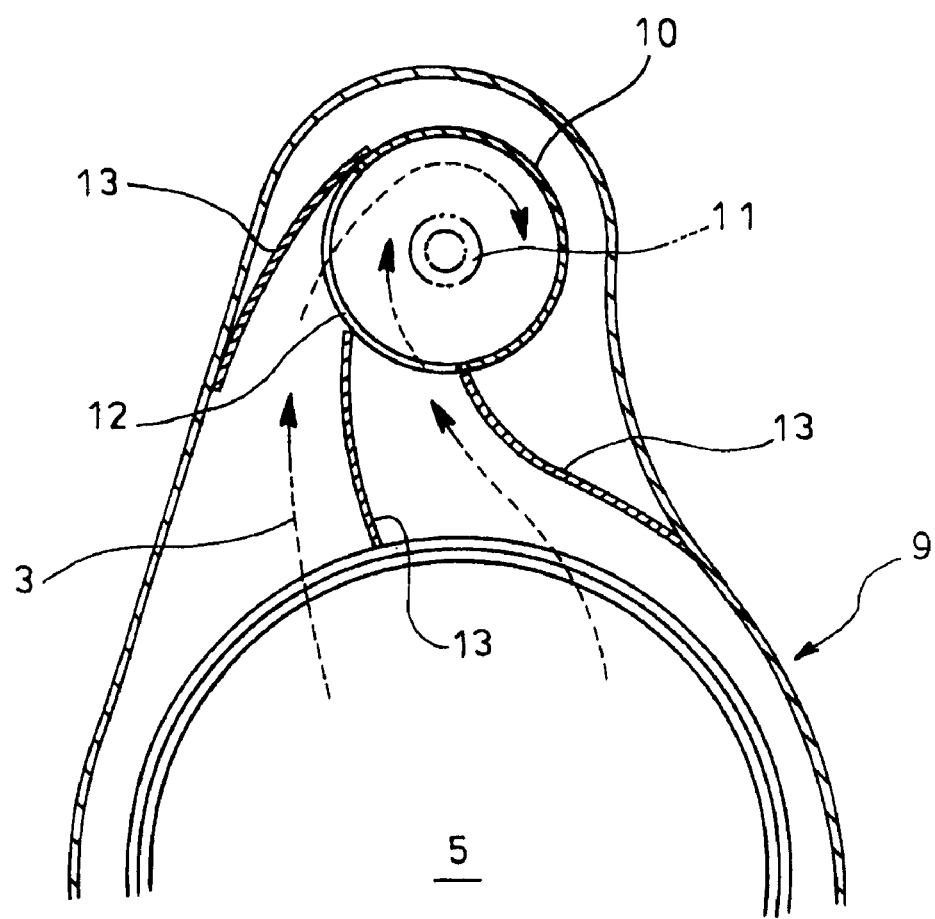
FIG. 2 is a sectional view at an entry end of a mixing pipe shown in FIG. 1 looking in a direction confronting the entry end.
Figure 3:
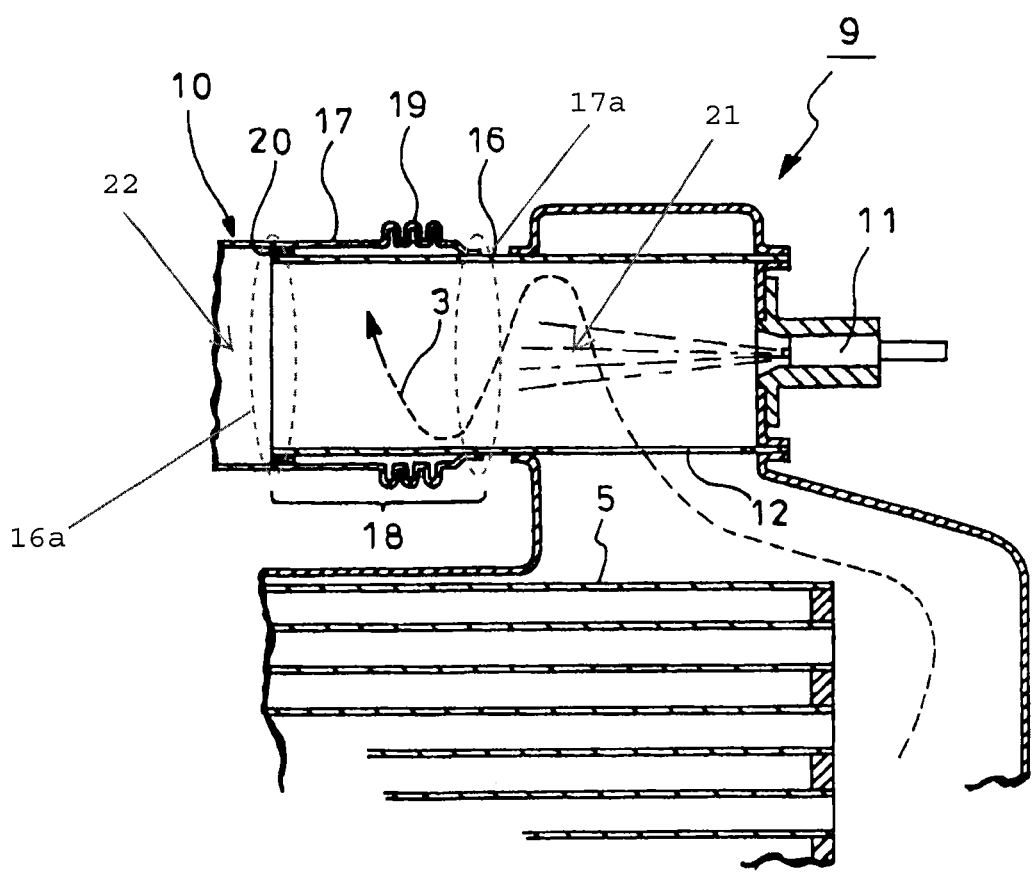
FIG. 3 is a sectional view showing an embodiment of the invention.

FIG. 3 shows an embodiment of an exhaust emission control device according to the invention. In the embodiment directed to an exhaust emission control device constructed substantially similar to that described above with reference to FIGS. 1 and 2, an intermediate portion of a mixing pipe 10 (straight portion extending axially of the particulate filter 5 and the selective reduction catalyst 6 (see FIG. 1)) in a communication passage 9 provides a double-wall portion 18 where inner and outer pipes 16 and 17 providing an upstream duct 21 and downstream duct 22 in the mixing pipe 10, respectively, are overlapped with each other in a relatively stretchable and retractable manner.

The outer pipe 17 in the double-pipe portion 18 has a terminal end 17a secured to an outer periphery of the inner pipe 16 and is formed with an axially expansible and contractible bellows 19. The inner pipe 16 has a terminal end 16a with an outer periphery over which a sealing ring 20 is fitted for slidable abutment on the inner periphery of the outer pipe 17 so as to prevent intrusion of the exhaust gas 3.

Thus, in this manner, even if thermal expansion difference between the particulate filter 5 and the selective reduction catalyst 6 becomes greater upon, for example, forced regeneration of the particulate filter 5, such thermal expansion difference is absorbed by expansion or contraction of the bellows 19 of the double-pipe portion 18, so that relative thermal strain between the particulate filter 5 and the selective reduction catalyst 6 is prevented from occurring. As a result, stress is prevented from being concentrated at connections and flections of the communication passage 9 for connection of the particulate filter 5 with the selective reduction catalyst 6.

The bellows 19 on the outer pipe 17 provides a number of continuous annular grooves on an inner periphery of the outer pipe and inverse in shape to the bellows 19; these annular grooves are covered by the inner pipe 16 so as not to be exposed to the flow of the exhaust gas 3. As a result, mist of the urea water is prevented from colliding against the annular grooves, so that urea water is prevented from being disposed as solid urea without decomposition into ammonia.

Moreover, the sealing ring 20 is fitted over the outer periphery of the terminal end 16a of the inner pipe 16 to slidably abut against the inner periphery of the outer pipe 17 so as to prevent intrusion of the exhaust gas 3, so that there is no fear that the exhaust gas 3 enters into the gap between the inner and outer pipes 16 and 17 with the mist of the urea water entrained thereby. Furthermore, the terminal end 16a of the inner pipe 16 is kept coaxial with the inner periphery of the outer pipe 17 by the sealing ring 20, so that even if the bellows 19 is expanded or contracted, the relative displacement of the inner and outer pipes 16 and 17 is axially guided to prevent the curved displacement at the bellows 19.

Thus, according to the above embodiment, thermal expansion difference between the particulate filter 5 and the selective reduction catalyst 6 can be reliably absorbed without causing deposition of urea, and relative thermal strain between the particulate filter 5 and the selective reduction catalyst 6 owing to such thermal expansion difference is prevented. This prevents the concentration of stress at, for example, connections and flections of the communication passage 9.

Moreover, intrusion of the exhaust gas 3 into the gap between the inner and outer pipes 16 and 17 can be prevented by the sealing ring 20 to prevent the mist of the urea water entering between the inner and outer pipes 16 and 17 and depositing the urea. Furthermore, the terminal end 16a of the inner pipe 16 can be kept coaxial with the inner periphery of the outer pipe 17 by the sealing ring 20, so that even if the bellows 19 is expanded or contracted, relative displacement of the inner and outer pipes 16 and 17 can be axially guided to prevent curved displacement at the bellows 19; as a result, a reduction in strength of the mixing pipe 10 in the communication passage 9 can be prevented.

INDUSTRIAL APPLICABILITY

It is to be understood that the invention is not limited to the above embodiment and that various changes and modifications may be made without departing from the scope of the invention. For example, construction for addition of urea water to midway of the communication passage is not always limited to that shown in the drawings.

The invention claimed is:

1. An exhaust emission control device comprising
a particulate filter;
a selective reduction catalyst capable of selectively reacting $NO_x$ with ammonia even in the presence of oxygen, wherein the selective reduction catalyst is arranged downstream of and in parallel with the particulate filter such that a selective reduction catalyst entry end is directed in the same direction as a particulate filter entry end;
an S-shaped communication passage for introduction of exhaust gas from a particulate filter discharge end to the selective reduction catalyst entry end through a turn-down; and
a urea water inlet upstream of the S-shaped communication passage,
wherein an intermediate portion of the S-shaped communication passage includes a double-pipe portion that provides an upstream duct and a downstream duct and defines a straight section of the S-shaped communication passage that extends axially of the particulate filter and the selective reduction catalyst,
wherein the double-pipe portion includes an outer pipe that overlaps an inner pipe, the outer pipe and the inner pipe are stretchable and retractable, the inner pipe provides one of the upstream duct and the downstream duct and the outer pipe provides the other of the upstream duct and the downstream duct,
wherein the double-pipe portion includes a sealing ring that is fit over a first location on an outer periphery of the inner pipe at a terminal end of the inner pipe to slidably abut against an inner periphery of the outer pipe so as to prevent intrusion of the exhaust gas into a portion of the outer pipe that overlaps the inner pipe, and a terminal end of the outer pipe is secured to a second location on the outer periphery of the inner pipe and the outer pipe is formed with an axially expansible and contractible bellows disposed between the terminal end of the outer pipe and the sealing ring.

2. The exhaust emission control device of claim 1, wherein the urea water inlet is separated from annular grooves of the bellows by a portion of the inner pipe that is overlapped by the outer pipe so as to not be exposed to a flow of exhaust gas and such that the urea water does not collide against the annular grooves.

* * * * *